United States Patent [19]
Cattaneo

[11] Patent Number: 5,921,146
[45] Date of Patent: Jul. 13, 1999

[54] AIR BAG STEERING WHEEL WITH VISIBLE SPOKES

[75] Inventor: Marco Cattaneo, Pavia, Italy

[73] Assignee: Breed Automotive Technology, Inc., Lakeland, Fla.

[21] Appl. No.: 08/949,191

[22] Filed: Oct. 14, 1997

[30] Foreign Application Priority Data

Oct. 15, 1996 [IT] Italy .................................. MI96A2133

[51] Int. Cl.⁶ ...................................................... B62D 1/04
[52] U.S. Cl. .............................................. 74/552; 280/731
[58] Field of Search .............................. 74/552; 280/731; 200/61.54, 61.55, 61.57

[56] References Cited

U.S. PATENT DOCUMENTS

| | | |
|---|---|---|
| 3,532,360 | 10/1970 | Leising et al. ........................... 280/731 |
| 3,580,603 | 5/1971 | Chute ....................................... 280/731 |
| 3,600,003 | 8/1971 | Carey ..................................... 74/493 X |
| 3,680,884 | 8/1972 | Stephenson .............................. 280/731 |
| 3,819,203 | 6/1974 | Radke et al. ............................. 280/731 |
| 3,827,715 | 8/1974 | Lynch . |
| 4,167,276 | 9/1979 | Bell et al. . |

FOREIGN PATENT DOCUMENTS

| | | |
|---|---|---|
| 0 050 309 A1 | 4/1982 | European Pat. Off. . |
| 35 08 380 A1 | 9/1985 | Germany . |
| 37 42 125 A1 | 6/1988 | Germany . |
| 1238 644 | 7/1971 | United Kingdom . |
| 2 142 299 | 1/1985 | United Kingdom . |
| 2 192 841 | 1/1988 | United Kingdom . |
| 2 242 871 | 10/1991 | United Kingdom . |

*Primary Examiner*—Vinh T. Luong
*Attorney, Agent, or Firm*—Nixon & Vanderhye, P.C.

[57] ABSTRACT

A motor vehicle steering wheel comprises an external handling rim having a core and a central unit with an air bag device. The central unit has radial spokes extending therefrom. The radial spokes are provided with T-shaped ends housed and fixed in an internal throat of the core of the handling rim.

11 Claims, 2 Drawing Sheets

AIR BAG STEERING WHEEL WITH VISIBLE SPOKES

BACKGROUND

I. Field of the Invention

The present invention consists of a motor vehicle steering wheel equipped with an air bag, featuring visible spokes for conferring a sporty appearance to the steering wheel itself.

II. Prior Art and Other Considerations.

It is now customary to supply steering wheels with safety devices of the "air bag" type, that allow the driver to avoid catastrophic collisions against the steering wheel and in particular against the steering column, in case of an accident.

On the other hand, the presence of an air bag device in known steering wheels requires into a total covering of the central portion of the wheel, including the spokes, with the result of compromising the sporty character steering wheel. This can definitely be disagreeable to certain end users.

Object of the present invention is to implement a motor vehicle steering wheel equipped with an air bag unit, structured in such a way as to keep part of the spokes in sight in order to maintain a sport appearance while yet complying with the required safety conditions.

SUMMARY

According to the invention this objective has been achieved by means of a motor vehicle steering wheel that includes an external handling rim and a central unit housing the air bag, and has radial spokes extending outwards and attached to said handling rim. The central unit comprises of two parts: a lower part shaped as a bowl is designed to accommodate the air bag device and to be attached to the steering column and comprises radial spokes. An upper part is essentially flat and serves to support a covering element for the air bag device and is itself provided with radial spokes extending from the sides of the covering element and is overlapped and fastened to an inside portion of the lower part radial spokes.

In this way the presence of the air bag device does not compromise the sport appearance of the steering wheel, that is fully maintained by the visible spokes extending between the air bag device and the external handling rim.

BRIEF DESCRIPTION OF THE DRAWINGS

The characteristics of the present invention will be made even more evident by the following detailed description of some embodiments thereof illustrated as a non-restrictive example in the attached drawings, where.

DETAILED DESCRIPTION OF THE DRAWINGS

Figure 1:
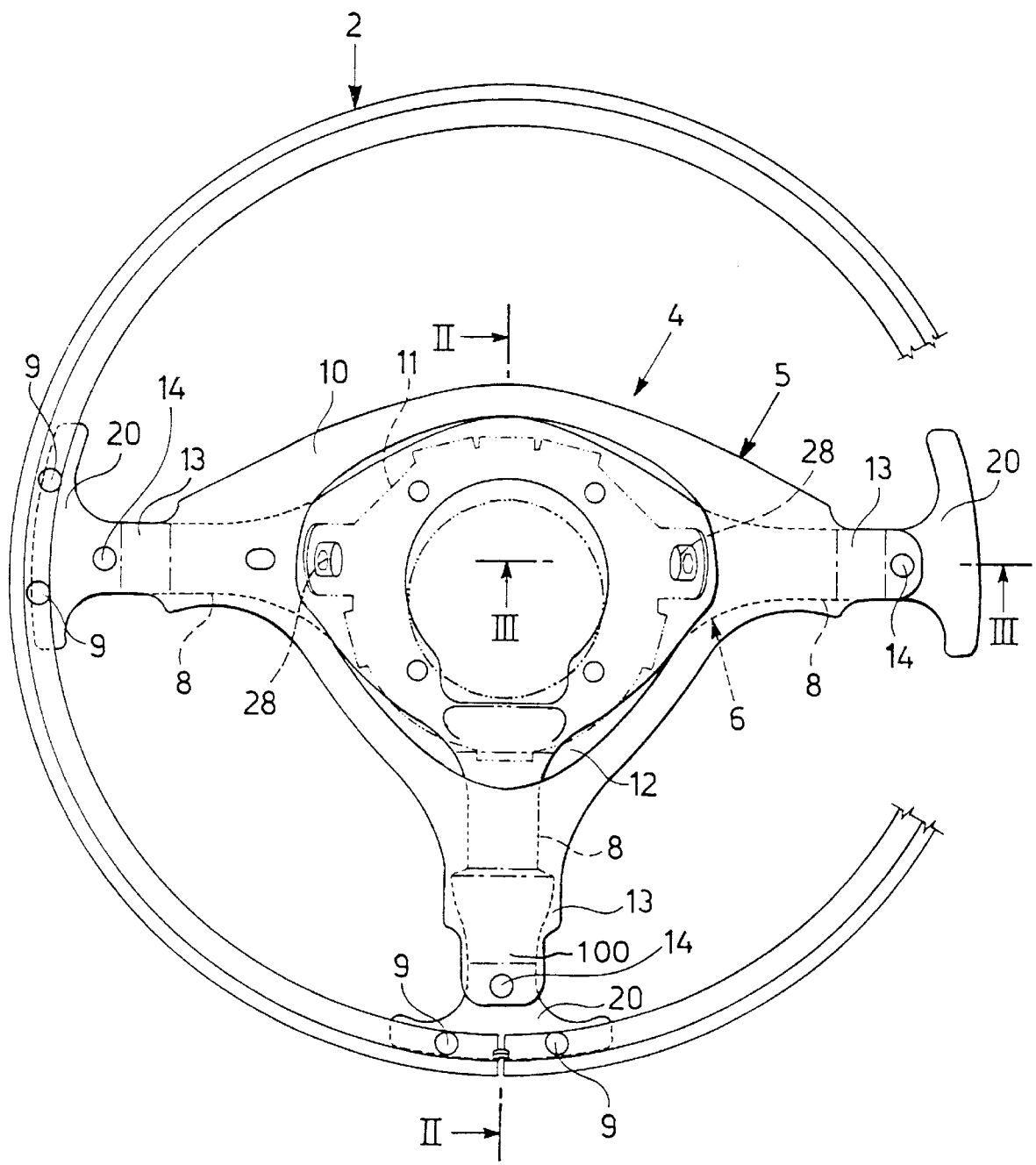
FIG. 1 shows a plan of the steering wheel according to the invention as viewed from above.
Figure 2:
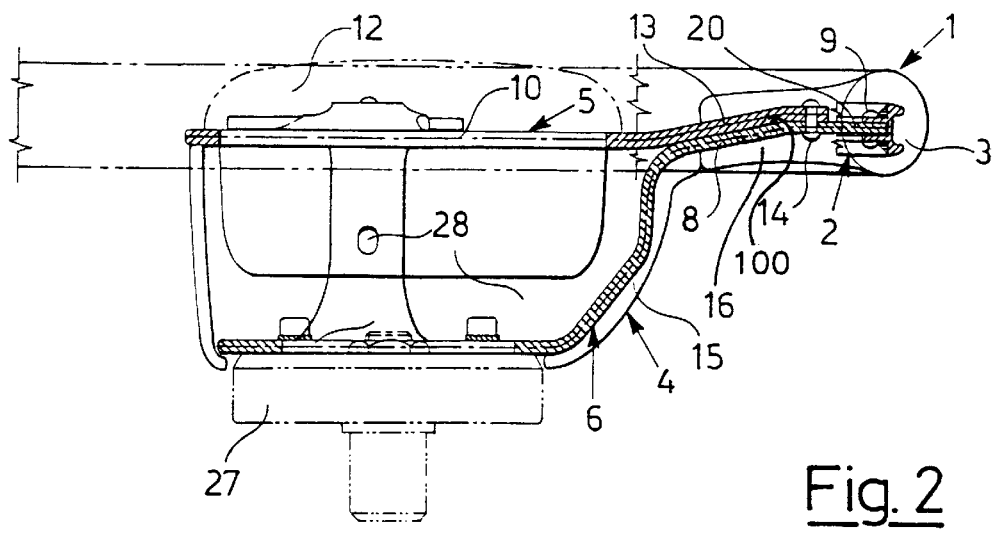
FIG. 2 shows a section of said steering wheel along the line II—II of FIG. 1.
Figures 3, 4:
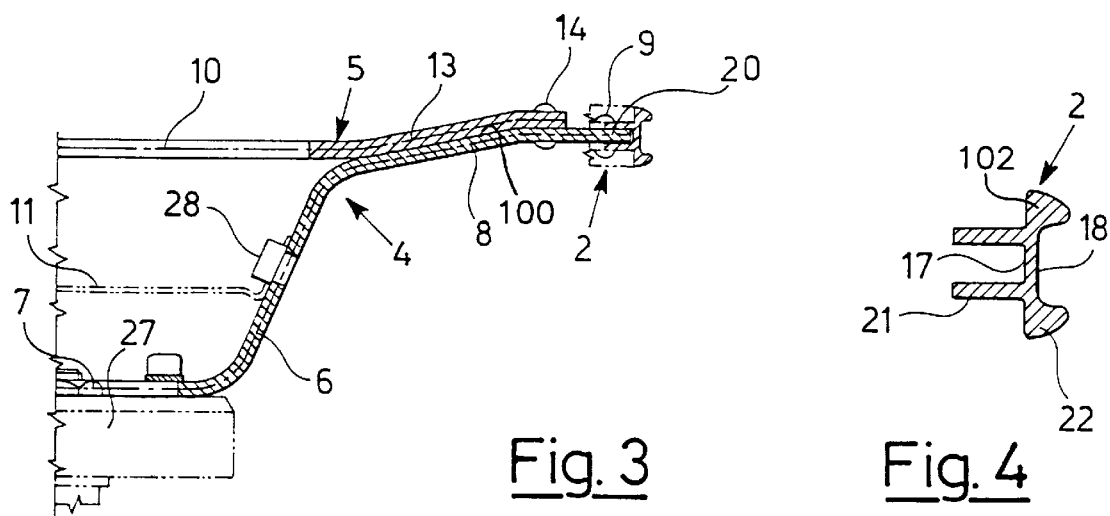
FIG. 3 shows a section of said steering wheel along the line III—III of FIG. 1.
FIG. 4 shows a cross section, enlarged in scale, of the handling rim inner metal core of the steering wheel of FIGS. 1–3.

The steering wheel in FIGS. 1, 2 and 3 includes a round handling rim 1 comprizing of an inner metal core 2 with a constant section and of an external body 3 (in wood, polyurethane at sight, polyurethane with leather or other appropriate coating).

The steering wheel includes also a central unit 4 made of two overlapping metal parts 5 and 6 fixed one to the other. The lower part 6 is shaped as a bowl with a central base 7 to be attached to the steering column by means of an end hub 27 and three T-shaped external ends 20 radial spokes 8. The spokes 8 extend radially and upwards to reach the metal core 2 of the handling rim 1 and are fastened to it by means of nails or rivets 9, as shown as an example in FIGS. 1–3. As an alternative, the metal core 2 can be made as a sole casting together with the spokes 8 or it can be made out of a bent sheet or even as an extruded shape and subsequently bent.

As shown more clearly in FIG. 4, the inner metal core 2 of the handling rim 1 comprises of a bent metal structural shape 102 having constant section, that provides for an internal throat 17 and an external throat 18. The internal throat 17 serves to house the T-shape ends 20 of the radial spokes 8 and in this regard it is equipped with two close parallel flanges 21 having constant section, conferring the internal throat 17 a relatively reduced width, just greater than the thickness of the radial spokes 8 T-shape ends 20. The external throat 18 has a greater width and a reduced thickness and provides for two short side flanges 22 having a thickness increasing from the outside to the inside serving to grant transverse strength to the metal core 2 and therefore to the handling rim 1.

The upper part 5 of the central unit 4 is itself essentially flat in shape with a concave central portion 10 designed to accommodate an air bag device schematically indicated at 11, housed inside the concavity of the lower part 6 and fastened to it by means of bolts 28 and covered with a covering element 12 supported by said central concave portion 10. From the latter, portions of the spokes 13 extend laterally overlapped and fastened by means of nails or rivets 14 to an inside portion 100 of the radial spokes 8 of the lower part 6.

The invention finally provides for a lower covering 15 with a coating 16 extending from the handling rim 1.

The result is a steering wheel with air bag, that provides for visible metal spokes aimed at conferring a sport appearance to the steering wheel itself.

Figure 5:
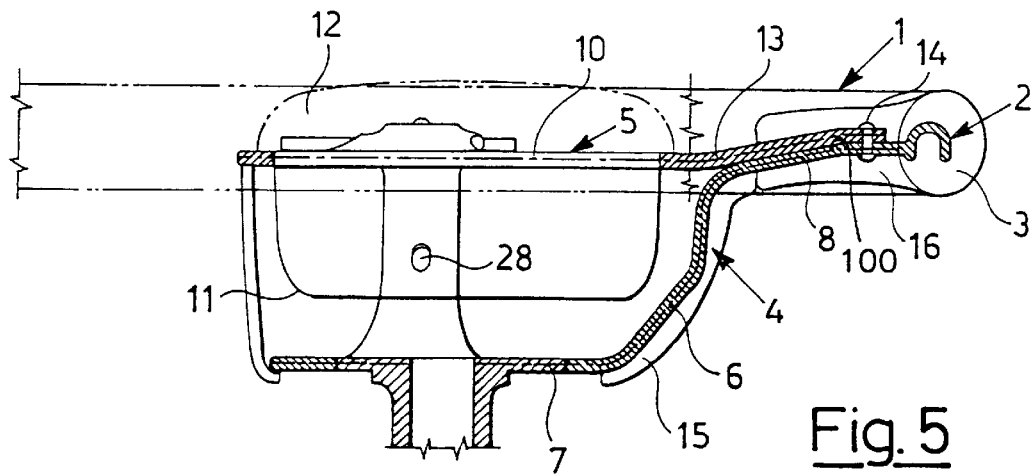
FIG. 5 shows a section view analogous to that of FIG. 2, referring to a variation of the steering wheel in the previous Figures.

The variation in FIG. 5 shows the same structure characteristics of the steering wheel in FIGS. 1–3, with the exception of the base of the lower part 6 of the central unit 4, designed for direct attachment to the steering column, and of the rim 1 metal core 2, consisting in a reversed U-section made of a casting with said lower part 6.

I claim:

1. A motor vehicle steering wheel comprising:
   an external handling rim having a core;
   a central unit with an air bag device, said central unit being comprised of:
   a lower part shaped as a bowl and accommodating the air bag device, the lower part being attached to a steering column and having lower part radial spokes; and
   an upper essentially flat part which supports a covering element for the air bag device, the upper part being provided with upper part radial spokes extending from sides of said covering element and overlapped and fixed to an inside portion of said lower part radial spokes; and
   wherein said lower part radial spokes are provided with T-shaped ends housed and fixed in an internal throat of said core of the handling rim.

2. A steering wheel according to claim 1, wherein said core of the handling rim is made of an extruded shape bent and attached to said radial spokes.

3. A steering wheel according to claim 1, wherein said core of the handling rim is made of a bent metal sheet.

4. A steering wheel according to claim 1, wherein said core of the handling rim is made of a casting with said radial spokes.

5. A steering wheel according to claim 1, wherein said core is a metal core.

6. A steering wheel according to claim 1, wherein said internal throat of said core of the handling rim has two parallel flanges which provide the internal throat with a width just greater than a thickness of the lower part radial spokes.

7. A steering wheel according to claim 1, wherein said core has an external throat comprised of two flanges.

8. A motor vehicle steering wheel comprising:

an external handling rim having a core;

a central unit with an air bag device, said central unit having radial spokes extending therefrom;

wherein said radial spokes are provided with T-shaped ends housed and fixed in an internal throat of said core of the handling rim.

9. A steering wheel according to claim 8, wherein said core is a metal core.

10. A steering wheel according to claim 8, wherein said internal throat of said core of the handling rim has two parallel flanges which provide the internal throat with a width just greater than a thickness of the lower part radial spokes.

11. A steering wheel according to claim 8, wherein said core has an external throat comprised of two flanges.

* * * * *